G. R. WEST.
METHOD OF FINISHING OR POLISHING GLASS ARTICLES.
APPLICATION FILED JUNE 21, 1913.

1,210,572.

Patented Jan. 2, 1917.

UNITED STATES PATENT OFFICE.

GEORGE R. WEST, OF PITTSBURGH, PENNSYLVANIA.

METHOD OF FINISHING OR POLISHING GLASS ARTICLES.

1,210,572. Specification of Letters Patent. Patented Jan. 2, 1917.

Application filed June 21, 1913. Serial No. 775,136.

*To all whom it may concern:*

Be it known that I, GEORGE R. WEST, a citizen of the United States, residing at Pittsburgh, in the county of Allegheny and State of Pennsylvania, have invented certain new and useful Improvements in Methods of Finishing or Polishing Glass Articles, of which the following is a specification.

The prime object of my invention is to provide a new and improved method of finishing or polishing the surface of a glass article, and particularly the interior surface thereof.

My improved method is particularly applicable for use in connection with the manufacture of pressed or molded glass articles and blanks for cut-glassware in which the glass article has been shaped in a mold, usually by means of a coacting plunger.

I am aware that prior to my invention, methods of treating the interior surface of a pressed or molded glass article by means of a fire-blast or a polishing-flame both before and after the removal of the article from the mold, have been practised. In the practice of such methods, the fire-blast comes into direct contact with the surface to be finished, the object being to reheat and melt the surface. In carrying out the fire-blast method, a mixture of gas and air is usually employed as the fuel, and such a mixture coming into direct contact with the article is objectionable in that certain harmful substances contained in the mixture, as for example sulfur, is transferred to the surface to be finished. My invention is to be distinguished from these methods in that I dispense with the use of a blast and its accompanying disadvantages, and, further, that in carrying out my process, I do not reheat nor melt the surface to be polished or finished.

Figure 1:
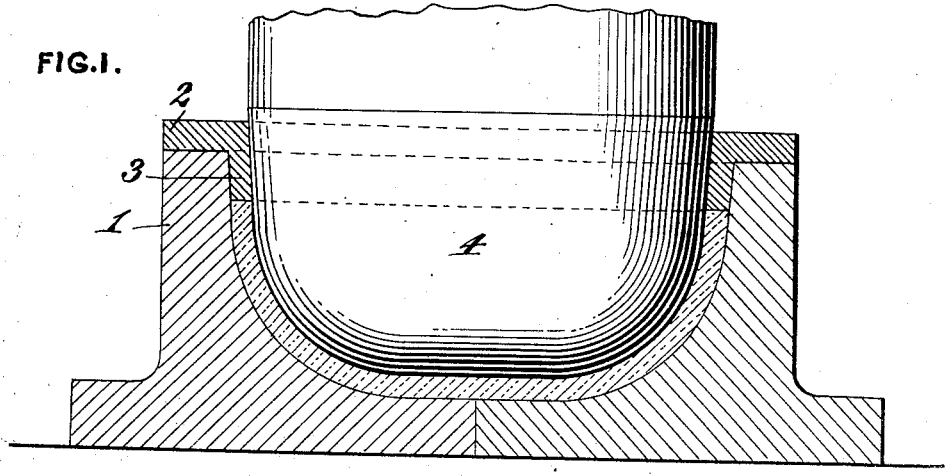
Figure 2:
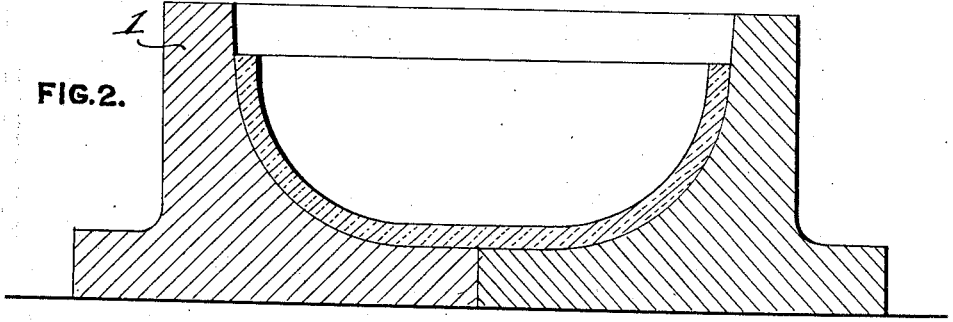
Figure 3:
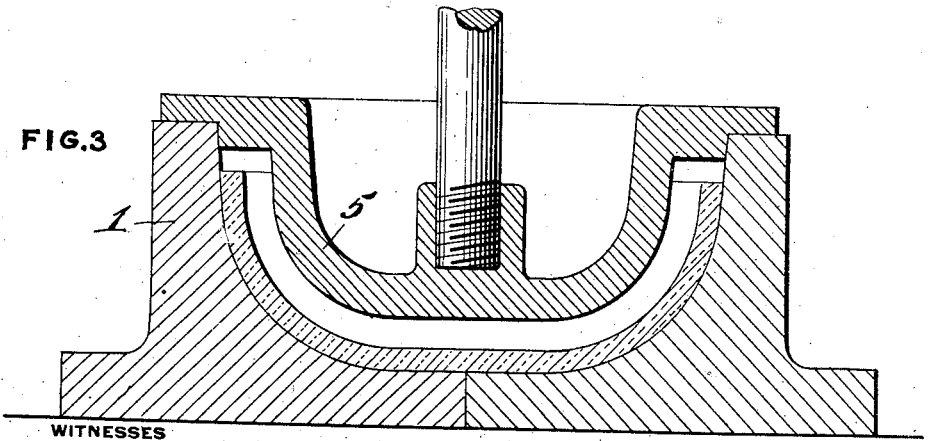

In the accompanying drawing, which illustrates means for carrying out my improved method: Figure 1 is a vertical sectional view showing a mold, a ring thereon, and a plunger inserted into the mold; Fig. 2, is a similar view showing the plunger and ring removed, with the molded glass within the mold; and Fig. 3 is a similar view showing in connection with the mold and the molded article, a tool or closure device employed in carrying out my process.

Referring to the drawing, 1 designates a mold of the usual and well known construction, 2 a ring superposed thereon and having a depending flange 3, and 4 a plunger.

The article to be manufactured is formed by lowering the plunger into the mold. After this operation, the plunger is withdrawn and the ring removed from the mold.

In carrying out my method of finishing or polishing a surface of the glass article, I preferably, but not necessarily, treat the molded or shaped glass while in the forming mold. In the accompanying drawing, the shaped article is shown in the mold, and in this case I apply to the mold a heated tool or closure 5, as particularly shown by Fig. 3. This closure 5 may be of any desired form and construction, preferably of such shape as to co-act with the mold in forming a comparatively tight fit to prevent or retard the escape of heat from the interior of the mold. The shape of the tool will vary depending on the shape and configuration of the article or the mold in which the molten glass is shaped. That portion of the tool entered in the mold is spaced away from and entirely out of contact with the shaped article contained therein.

In practice, in case the article is retained in the mold, immediately after the plunger has been withdrawn from the mold and the ring removed therefrom, the mold is closed by placing the heated tool or closure thereon, thereby retaining or retarding the escape of heat and at the same time introducing to the surface to be finished radiated heat. The temperature of the radiated heat applied to the said surface will, of course, gradually diminish, and by maintaining the glass article in the closed mold or other receptacle a comparatively short time, a very desirable polish or finish is given to the surface of the article desired to be finished.

Under my method of polishing, I dispense with a fire-blast and, of course, no sulfur is carried into contact with the surface of the article, and in the practice of my process, any foreign particles carried by the plunger or in the atmosphere that may be deposited on the surface to be finished, are consumed, leaving the said surface smooth and effectively polished.

What I claim is:—

1. The method of making a glass article with a polished surface which consists in shaping the molten glass in a mold, and then polishing a face thereof by producing an inclosing cavity in which the face to be polished is subjected to heat radiation substantially throughout the article face.

2. The method of making a glass article with a polished surface which consists in shaping the molten glass in a mold, and then polishing a face thereof by producing an inclosing cavity in which the face to be polished is subjected to the action of a gradually diminishing temperature.

3. The method of making a glass article with a polished surface which consists in shaping the molten glass in a mold, and then polishing a face thereof by producing an inclosing cavity in which the face to be polished is in direct opposition to but spaced from a cavity wall formed to produce a heat radiation action within the cavity substantially uniform throughout the article face.

4. The method of making a glass article with a polished surface which consists in shaping the molten glass in a mold, and, while maintaining contact of article and mold on the portion of the article to be unacted upon, inclosing the article by producing a cavity in which the face to be polished is subjected to heat radiation substantially uniform throughout the article face.

5. The method of making a glass article with a polished surface which consists in shaping the molten glass in a mold, and, while maintaining contact of article and mold on the portion of the article to be unacted upon, inclosing the article by producing a cavity in which the face to be polished is free from flame contact and subjected to heat radiation substantially uniform throughout the article face.

6. The herein described process of making a glass article which consists in forming molten glass into the desired shape in a mold, and then polishing a surface thereof by substituting a heated tool for the shaping tool to form an inclosing cavity for the article and maintaining the heated tool spaced from the surface to be polished.

7. The method of making a glass article with a polished surface which consists in successively shaping the molten glass in a mold and polishing the surface by radiant heat without intermediate cooling of the article below the temperature of the polishing heat.

8. The method of polishing surfaces of shaped glass articles which consists in forming a closed article-containing cavity with that wall of the cavity opposing the surface to be polished spaced from such surface and heated to subject the surface to the action of radiant heat from the wall.

9. The method of polishing surfaces of shaped glass articles which consists in forming a closed article-containing cavity prior to substantial loss of the shaping heat by the article with that wall of the cavity opposing the surface to be polished spaced from such surface and heated to subject the surface to the action of radiant heat from the wall.

In testimony whereof I affix my signature in presence of two witnesses.

GEORGE R. WEST. [L. S.]

Witnesses:
 W. G. DOOLITTLE,
 F. E. GAITHER.